(12) United States Patent
Dhandapani

(10) Patent No.: US 8,949,212 B1
(45) Date of Patent: Feb. 3, 2015

(54) LOCATION-BASED INFORMATON DISPLAY

(76) Inventor: Hariharan Dhandapani, Fremont, CA (US)

( * ) Notice: Subject to any disclaimer, the term of this patent is extended or adjusted under 35 U.S.C. 154(b) by 0 days.

(21) Appl. No.: 13/179,357

(22) Filed: Jul. 8, 2011

(51) Int. Cl.
*G06F 7/00* (2006.01)
*G06F 17/30* (2006.01)

(52) U.S. Cl.
USPC .......................................................... 707/706

(58) Field of Classification Search
USPC ......... 707/706, 244, 722, 728, 732, 736, 737, 707/738, 739, 740, 769, 780
See application file for complete search history.

(56) References Cited

U.S. PATENT DOCUMENTS

| | | | |
|---|---|---|---|
| 7,769,767 B2 | 8/2010 | Petersen | |
| 8,489,599 B2* | 7/2013 | Bellotti | 707/736 |
| 2003/0105826 A1* | 6/2003 | Mayraz | 709/206 |
| 2003/0220835 A1* | 11/2003 | Barnes, Jr. | 705/14 |
| 2004/0054731 A1* | 3/2004 | Carter et al. | 709/206 |
| 2004/0068486 A1* | 4/2004 | Chidlovskii | 707/3 |
| 2004/0172403 A1* | 9/2004 | Steele et al. | 707/100 |
| 2004/0252654 A1* | 12/2004 | Arnold et al. | 370/310 |
| 2004/0254718 A1* | 12/2004 | Cheon | 701/200 |
| 2005/0055353 A1* | 3/2005 | Marx et al. | 707/10 |
| 2005/0086243 A1* | 4/2005 | Abbott et al. | 707/100 |
| 2005/0097079 A1* | 5/2005 | Machida et al. | 707/3 |
| 2005/0148347 A1* | 7/2005 | Nagai | 455/456.6 |
| 2006/0059152 A1* | 3/2006 | Nakamura | 707/7 |
| 2006/0085392 A1* | 4/2006 | Wang et al. | 707/3 |
| 2006/0161634 A1* | 7/2006 | Tseng | 709/217 |
| 2006/0195462 A1* | 8/2006 | Rogers | 707/100 |
| 2007/0038950 A1* | 2/2007 | Taniguchi et al. | 715/768 |
| 2007/0061245 A1* | 3/2007 | Ramer et al. | 705/37 |
| 2007/0143345 A1* | 6/2007 | Jones et al. | 707/104.1 |
| 2007/0202886 A1* | 8/2007 | Dhebri et al. | 455/456.1 |
| 2007/0219716 A1* | 9/2007 | Shiragami | 701/210 |
| 2008/0021701 A1* | 1/2008 | Bobick et al. | 704/9 |
| 2008/0082490 A1* | 4/2008 | MacLaurin et al. | 707/3 |
| 2008/0082782 A1* | 4/2008 | Meijer et al. | 711/207 |
| 2008/0091728 A1* | 4/2008 | Diederiks et al. | 707/104.1 |
| 2008/0097975 A1* | 4/2008 | Guay et al. | 707/4 |
| 2008/0132251 A1* | 6/2008 | Altman et al. | 455/457 |
| 2008/0148175 A1* | 6/2008 | Naaman et al. | 715/781 |
| 2008/0195645 A1* | 8/2008 | Lapstun et al. | 707/102 |
| 2008/0195664 A1* | 8/2008 | Maharajh et al. | 707/104.1 |
| 2008/0234929 A1* | 9/2008 | Watson et al. | 701/207 |
| 2008/0235071 A1* | 9/2008 | Gutta et al. | 705/9 |
| 2009/0003659 A1* | 1/2009 | Forstall et al. | 382/113 |
| 2009/0031006 A1* | 1/2009 | Johnson | 709/218 |
| 2009/0089288 A1* | 4/2009 | Petersen | 707/9 |
| 2009/0157658 A1* | 6/2009 | Bonev et al. | 707/5 |
| 2009/0325556 A1* | 12/2009 | Lee et al. | 455/414.2 |
| 2010/0076968 A1* | 3/2010 | Boyns et al. | 707/732 |
| 2010/0082653 A1* | 4/2010 | Nair | 707/759 |
| 2010/0106801 A1* | 4/2010 | Bliss et al. | 709/219 |
| 2010/0138416 A1* | 6/2010 | Bellotti | 707/736 |
| 2010/0145948 A1* | 6/2010 | Yang et al. | 707/737 |
| 2010/0145987 A1* | 6/2010 | Harper et al. | 707/770 |
| 2010/0153386 A1* | 6/2010 | Tysowski | 707/736 |
| 2010/0161720 A1* | 6/2010 | Colligan et al. | 709/203 |

(Continued)

*Primary Examiner* — Robert Beausoliel, Jr.
*Assistant Examiner* — Nicholas Allen
(74) *Attorney, Agent, or Firm* — Foley & Lardner LLP

(57) ABSTRACT

A computer-implemented method comprises receiving information indicating a location of a user. The location information is determined by a computing device carried by the user. The method further comprises performing a search of user content. The user content is associated with the user and is searched based on the location of the user. The method further comprises communicating results of the search to the computing device.

10 Claims, 19 Drawing Sheets

(56) References Cited

U.S. PATENT DOCUMENTS

| | | | |
|---|---|---|---|
| 2010/0199328 A1* | 8/2010 | Heins et al. | 726/3 |
| 2010/0305848 A1* | 12/2010 | Stallman | 701/204 |
| 2010/0306233 A1* | 12/2010 | Zheng | 707/769 |
| 2011/0029474 A1* | 2/2011 | Lin | 706/50 |
| 2011/0063301 A1* | 3/2011 | Setlur et al. | 345/441 |
| 2011/0072257 A1* | 3/2011 | Milchtaich | 713/100 |
| 2011/0093515 A1* | 4/2011 | Albanese | 707/812 |
| 2011/0119258 A1* | 5/2011 | Forutanpour et al. | 707/723 |
| 2011/0125743 A1* | 5/2011 | Immonen et al. | 707/737 |
| 2011/0136502 A1* | 6/2011 | Hubner et al. | 455/456.1 |
| 2011/0213800 A1* | 9/2011 | Saros et al. | 707/769 |
| 2011/0295875 A1* | 12/2011 | El Daher et al. | 707/769 |
| 2011/0307841 A1* | 12/2011 | Boldyrev et al. | 715/863 |
| 2012/0072405 A1* | 3/2012 | Guay et al. | 707/706 |
| 2012/0078882 A1* | 3/2012 | Boldyrev et al. | 707/722 |
| 2012/0117051 A1* | 5/2012 | Liu et al. | 707/707 |
| 2012/0136865 A1* | 5/2012 | Blom et al. | 707/739 |
| 2012/0161971 A1* | 6/2012 | Nasir et al. | 340/573.4 |

* cited by examiner

LOCATION-BASED INFORMATON DISPLAY

BACKGROUND

Many people store vast amounts of information that is relevant and useful in their daily in electronic form, and often only in electronic form. As more people store a greater amount of their information in electronic form, an ongoing need exists for mechanisms that allow individuals not only to retrieve and present such electronic information back to the individual, but also to present only the information that the individual needs at that particular point in time.

SUMMARY

One embodiment of the invention relates to a computer-implemented method comprising receiving information indicating a location of a user. The location information is determined by a computing device carried by the user. The method further comprises performing a search of user content. The user content is associated with the user and is searched based on the location of the user. The method further comprises communicating results of the search to the computing device.

DETAILED DESCRIPTION OF EXAMPLE EMBODIMENTS

Figure 1:
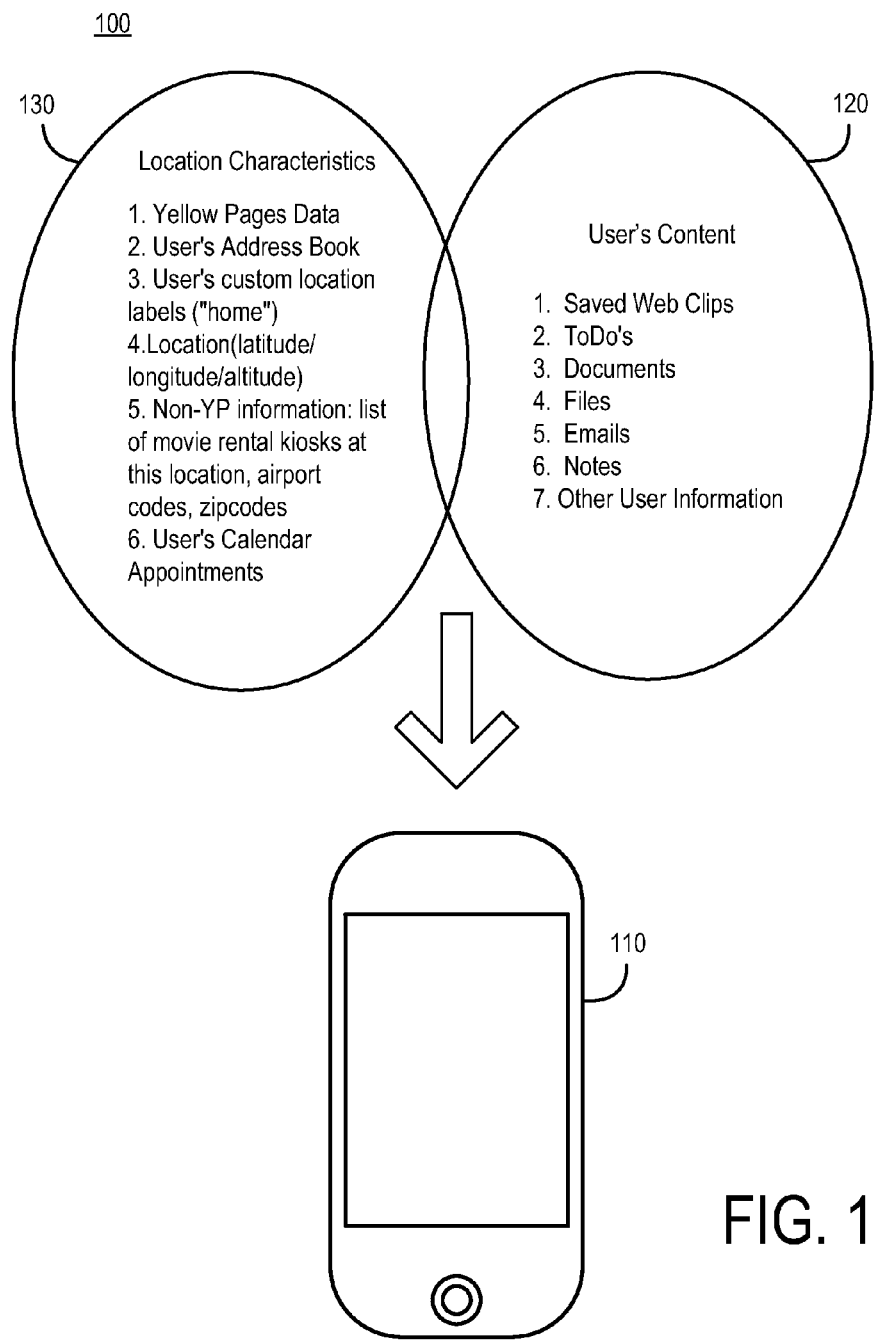
FIG. 1 shows an overview of a system that provides a location-based information display service to help users easily access information that the user needs at their current location.

Referring now to FIG. 1, FIG. 1 shows an overview of a system that provides a location-based information display service to help users easily access information that the user needs at their current location. The information may be accessed using a computing device 110, which is shown by way of example to be a smartphone. As will be described in greater detail below, other computing devices may also be used. The information that is accessed may include in particular the user's own information, e.g., emails, documents, files, web clips, ToDo lists, notes, or any other information the user may have access to in electronic form, as shown at 120. Various information about the location of the user (including that shown at 130) may be utilized to ensure the relevance of the information that is presented to the user at the user's current location.

Figure 2:
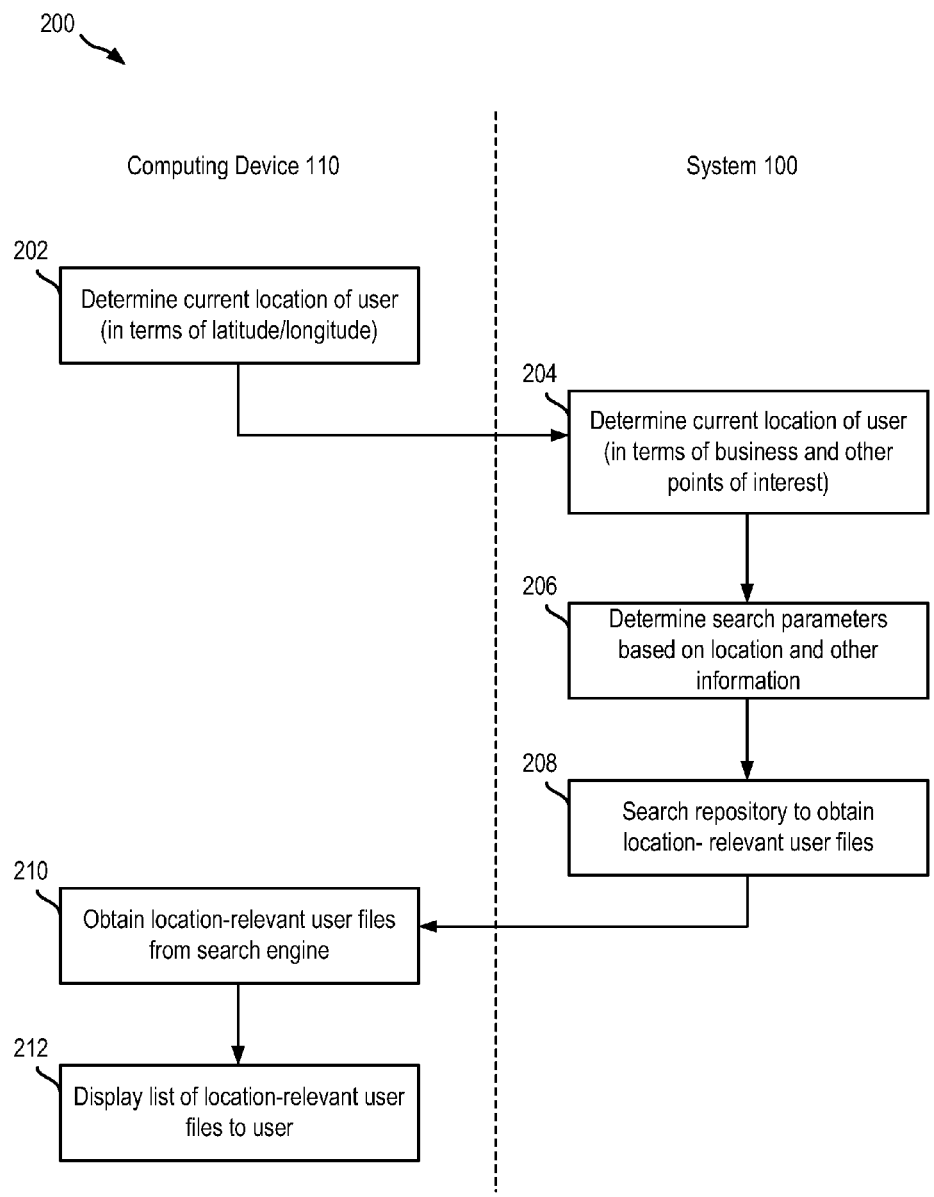
FIG. 2 shows an example of an overall process to help a user access their own information at the user's location.

Referring now also to FIG. 2, FIG. 2 shows an example of an overall process to present a user with their own information. At step 202, the location of the user is determined. For example, step 202 may be performed after the user launches an application (e.g., a client application executed by the computing device 110) and is authenticated by the system 100. For example, if the user arrives at a new location (e.g., an airport), the user may launch the application in order to obtain information relevant to that location (i.e., a "pull" method of delivering information). As another example, the application may have already been launched, and the system 100 may be in standby mode waiting for the user to request relevant information at a particular location. As another example, the application may execute in a background mode and continuously to deliver ("push") information automatically as the location of the user changes. The information that is delivered may be continuously updated based on what is relevant to the user at the user's current location.

The user's location may be determined in terms of latitude and longitude, for example. As will be appreciated, a variety of techniques may be used to determine location, such as GPS, Wifi-hotspot, cellular network positioning, or other techniques that may be available on the device being used by the user. As another example, the user's location may be determined in terms of altitude, e.g., if it is desired to provide the user with information while the user is traveling in an airplane. Other mechanisms for determining location may also be used.

Once the location is determined, the device 110 sends the location information to the system 100. As discussed in greater detail below, the system 100 includes a repository 330 (FIG. 3) of the user's information and a search engine 360 (FIG. 3) that is configured to perform a search of the repository 330 (FIG. 3) to identify information that is relevant to the user at the user's current location. Upon receiving the location information from the device 110, the search engine 360 first maps the coordinates to a street address, nearby businesses, institutions, landmarks, etc., such that it is known not only where the user is located in terms of latitude and longitude, but also where the user is located in terms of nearby businesses and other landmarks that are of interest to the user (step 204). For example, the search engine 360 may access a database that accepts latitude and longitude as input and that provides a list of nearby businesses as output. Other databases may be accessed to include businesses and points of interest that frequently do not appear in traditional business directories, such as movie rental kiosks, airports codes, and so on. As another example, the user may be provided the ability to assign labels to locations, e.g., so that it is known that a particular latitude/longitude corresponds to the user's workplace, to the user's favorite coffee shop, and so on. As another example, the user's address book may be accessed so that the significance of a particular address to the user can be deduced (e.g., for a salesperson, so that it can be deduced that the user is at the location of a particular customer). The system 100 may access third-party services to map such location into the above set or use its own databases.

Once such additional information is known about the user's location, this information is then analyzed and used to determine search parameters (e.g., a search query) for searching the repository 330 (step 206). For example, if it is determined that the user is near LaGuardia, then "airport" and "LGA" may be used as search terms.

The search terms are then used to search the repository 330 to locate the most relevant files for the user given the user's current location (step 208). As described in greater detail below, the repository 330 may contain the user's emails, documents, songs, images, text, blobs, and any other information to which the user has access, including the user's information (i.e., information that is created or maintained by the user and that is not available in public repositories). The search and filtering of search results may also be performed based on other parameters, such as user's preferences, user-provided tags for content item(s), document contents, and other information deemed relevant to make this determination.

Once the computing device 110 obtains the search results from the system 100 (step 210), computing device 110 may display a summary of the results to the user and permit the user to select items that are of interest for further detail to be displayed (step 212). The computing device 110 presents only the subset of user's information which system 100 has determined is likely to be most relevant at the user's current location.

As will therefore be appreciated, the system 100 may provide a useful location-based information display service to help users easily find their own information. For example, many individuals go on business trips and need to access specific information during their trips. For example, in the case of a sales professional, the sales professional may be preparing to go on a business trip to another city (e.g., a San Francisco-based sales professional may be planning a trip to New York). Such an individual may wish to have certain information readily accessible at different times during their trip. As the sales professional gathers or encounters emails and documents the sales professional might need later, the sales professional is able to push those files to the system 100 using tools described in greater detail below (in connection with FIGS. 3-7). Such files may contain information about what the sales professional wants to accomplish during the meeting and other relevant information about the customer from a customer relations management (CRM) system (e.g., shipments made to the customer, pending payments, status of customer support tickets, etc.). Likewise, the sales professional may have booked a flight and confirmed a hotel, and the sales professional may wish to have the confirmation information handy when arriving at the hotel. The sales professional may also have received an e-mail from the customer with special directions to the customer's location and building number, and may wish to have that information handy when arriving at the customer's location. As described in greater detail below, the system 100 indexes the user's content by location and delivers only those emails and documents relevant to the user's present location (i.e., while the user is using the system 100 via a mobile computing device, such as a smartphone). The system 100 determines the user's location from the mobile device and, based on the user's location, determines the relevant emails and other files that the user needs at that location. Hence, in operation, when the sales professional walks into the airport during the trip, the sales professional's e-ticket email with the confirmation number is delivered to the computing device 110 to facilitate check-in. After the sales professional arrives in New York, and reaches the hotel, the hotel confirmation email may be delivered to the computing device 110. When the sales professional is ready to visit the customer, the customer email with special directions shows up on the computing device 110. After the sales professional arrives at the customer's location, all the relevant customer information from CRM system of the user displays automatically on the computing device 110. Hence, pertinent information is displayed on the computing device 110 when and where it is needed by the sales professional.

Figure 3:
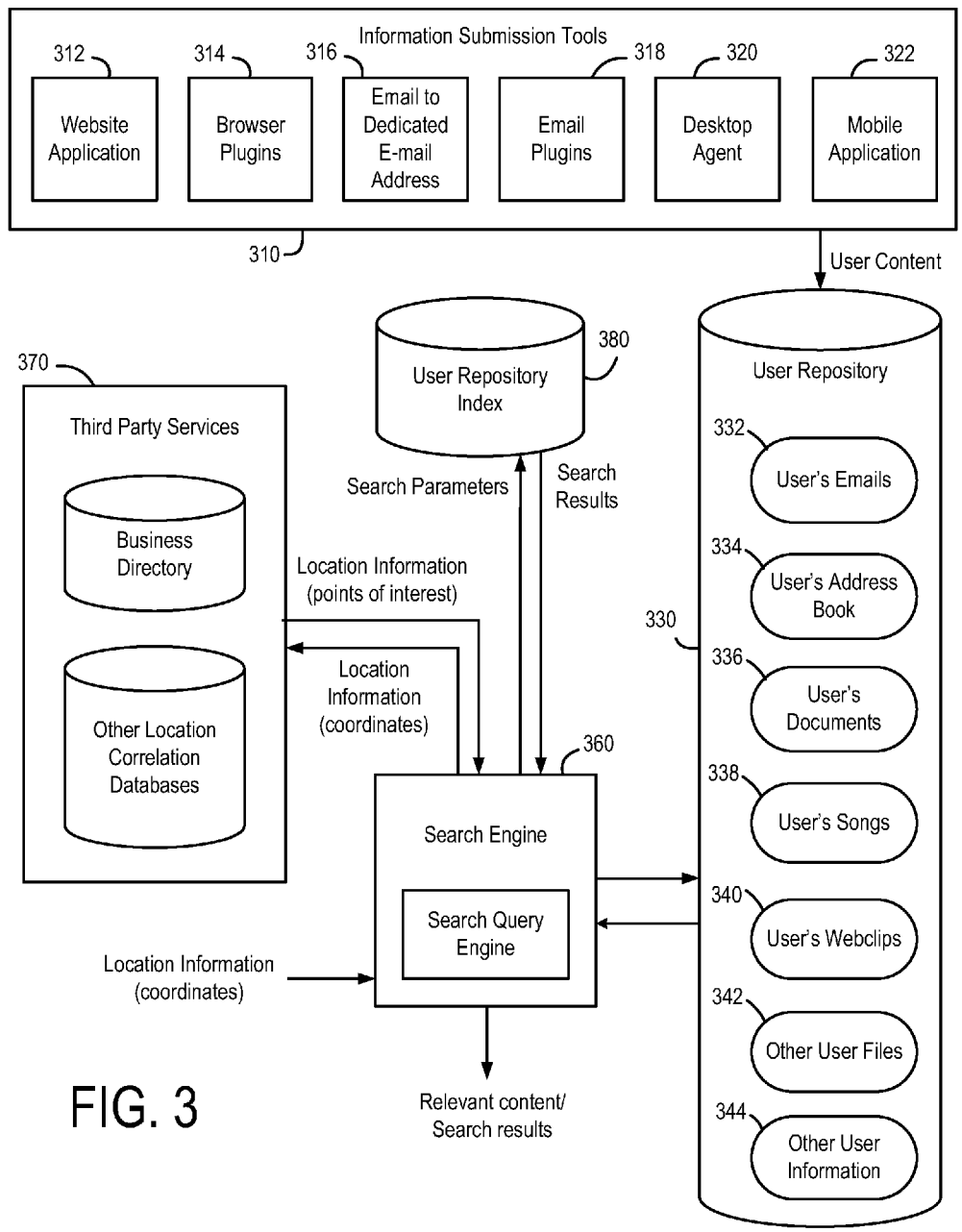
FIGS. 3 and 4 show the system of FIG. 1 in greater detail.

Referring now to FIG. 3, FIG. 3 shows the system 100 in greater detail. As shown in FIG. 3, the system 100 may include information submission tools 310, user content repository 330, search engine 360, third party services 370, and user repository index 380.

The information submission tools 310 include various tools 312-322 accessible to the user to facilitate submission (e.g., pushing) of information to the system 100. For example, when the user comes across information the user might need elsewhere, the user may submit such information to the system 100 to ensure that it is accessible later. At the same time, the user may also tag the information with an appropriate tag representative of where the user might need that information (e.g., "airport", "San Francisco airport," etc.). In this manner, in addition to the location information obtained from the computing device 110, the system 100 may then also use the tags to determine whether the user needs any of their information at their current location. For example, in the example above, if the user arrives at another airport for which no airport-specific tags exist, then all emails and documents user has generically tagged "airport" may be displayed. However, if the arrives at the San Francisco airport, then files tagged "San Francisco airport" or "SFO" are displayed, since those files rank higher in the search results than those generically tagged "airport."

The tools 312-322 may be made accessible to the user via a website provided by the system 100, via plugins and other applications executing locally on the device 110, and/or via other mechanisms. Website application 312 is accessible via a website provided by the system 100 and may be used by the user to add/delete content to user's account. Users may bookmark the web application and access it to add content when browsing the web. When visiting a webpage, user may select the text the user wants to "push" to the system 100 and clicks the bookmark, logs in if necessary, and then adds the content along with "tagging" the content as necessary. Similarly, when the user receives an email, the user may cut and paste the contents to a window popped up by the bookmark to the webapp and tag it as appropriate.

Browser plugins 314 may be used to push webclips to the system 100. Browser plugins 314 may allow the user to select a block of text to submit to the system 100. The user may click a button, a menu item on a drop-down, or other command, to push that webclip (selected text) to the system 100. As another example, a modified "favorites" button may be provided as part of the browser plugin 314 that permits a user to push the uniform resource locator (URL) of a webpage of interest to the system 100. For example, a user that is planning on visiting the Statue of Liberty may click on the modified favorites button when visiting the government website relating to the Statue of Liberty (http://www.nps.gov/stli/index.htm). Later, when the user arrives at Battery Park en route to the Statue of Liberty, the URL for the website may be displayed on the device 110 to facilitate easy access to directions and other information of interest during the day of the visit.

E-mail tool 316 provides a mechanism for users to email content the system 100. For example, the system 100 may provide the user with a dedicated e-mail address (e.g., user@mobifind.com) to which the user can e-mail content. Various formats may be used to parse out tags and content from the email. For example, the subject line of the email may read: [Subject: E-ticket tag:airport]. In this case, the tag "airport" will be associated with this content item and the contents of the email becomes the content for the item. As another example, the tag may be included in the email address itself. For example, an e-mail sent to user@airport.mobifind.com may get tagged as "airport," and the contents of the email again become the content of the item. Other mechanisms also exist.

E-mail plugins 318 may be used by the user to push emails directly from their email client to the system 100. The plugins 318 provide a button, menu item or other command to choose, optionally tag and push emails to the system 100. This permits the user to forward an e-mail to the system 100 with the click of potentially only a single button.

Desktop agent 320 automatically pushes content to the user account at the system 100. The desktop agent 320 may be configured to push all emails or documents. As another example, the desktop agent may select only certain e-mails and documents to be pushed to system 100, such as only e-mails and documents matching certain keywords (and synonyms), only e-mails and documents in a particular folder, only documents of certain file-types, and so on. Other filters are also possible. As another example, the user may configure a "tag /keyword watch" push for e-mails and documents containing specific keywords. For example, a user may setup a push for a travel-related keyword (e.g., "Paris," "travel," etc.) to be active for a few weeks prior to a trip to Paris. When the user receives new e-mails during that time frame (e.g., if the user receives airline/hotel reservation emails), the desktop agent 320 automatically pushes such emails to the system 100. Such content is then delivered to the user in Paris. The desktop agent 320 may therefore watch for documents and emails matching the watch keyword and push all such matched content to the system 100, all in the background and without user intervention. Such tag/keyword watches may also be used to push content in other contexts, such as during web browsing.

Mobile application 322 may be used to submit information to the system 100 in the same manner that the desktop agent 320 is used to submit information from other types of computers. The mobile application 322 may also be used to receive feedback from a user. For example, after a piece of information has been displayed, the user may provide feedback indicating that the information is not relevant to the user at a particular location. Such information may be used to enhance operation of the search engine 360. As another example, if a user expected to be provided with a particular piece of information at a particular location, but was not provided with such information, feedback in that regard may be provided as well. Likewise, the mobile application 322 may be used to delete information from user's repository (e.g., indicating that information regarding a particular hotel reservation can be deleted now that the user has checked in). Alternatively, system 100 may also expire information automatically after a pre-set time. Users may also search for content using the mobile application 322. When the user requires some other information that is not relevant to current location, the user may search for such information using tags/keywords.

In addition to (or instead of) tags provided by the user, other information may be used by the system 100 to determine what the user needs at their location. For example, the system 100 may determine what the user needs at their location based on an automated analysis of the contents of the files pushed to the repositories at the system 100 by the user (e.g., system-generated tags). As other examples, the system 100 may determine what information the user needs at their location based on the user's preferences, user's previous usage patterns, etc. For example, if the user consistently does not use grocery related items shown at one supermarket chain A but uses such information consistently at another super market chain B, then the system may lower the priority of grocery related items at supermarket A for future requests.

In operation, to provide relevant content to a user, the location information (in the form of coordinates) is received from the computing device 110. The location information is provided to third party services 370 such as a business directory and/or other location correlation databases. For example, the business directory may be accessed through a third party web service, e.g., yellowpages.com. Other location correlation databases may include, for example, a list of locations for movie-rental kiosks, a list of airport codes, a list of zipcodes, etc. The third party services 370 return location information to the system 100 including a contextual identification of points of interest (e.g., that the user is near is movie rental kiosk, that the user is near a coffee shop, etc.). The user's address book may be accessed to provide similar information (e.g., that the user is near the home of the user's aunt, etc.). Based on such contextual location information, keywords are developed that are used as search parameters for searching the user's content stored in the repository 330.

In an example embodiment, the search engine 360 preprocesses the user content in repository 330 to index all the user's contents and build a keyword-based index 380 comprising an index of all keywords found in the user's contents. When conducting a search to identify content relevant to the user, the search engine 360 then searches for these keywords in the user's contents and then ranks matches by relevance, e.g., using one or more scoring mechanisms. As another example, the search may also build indexes on the fly. The tags that are assigned by the user are a specific type of keyword that may be associated with content. Because a tag is user-assigned, however, the existence of a tag match may be weighted more heavily (as opposed to the existence of other types of keyword matches) when the relevance of content is being ranked by the search engine 360. Other than the fact that tags are user assigned, and other than the fact that tag matches may be weighted more heavily, tags may otherwise be used in system 100 in the same manner as other types of keywords. Once the search completes and the results are ranked by order of relevance, the search engine 360 sends back those results to the client application executing on computing device 110.

Figure 4:
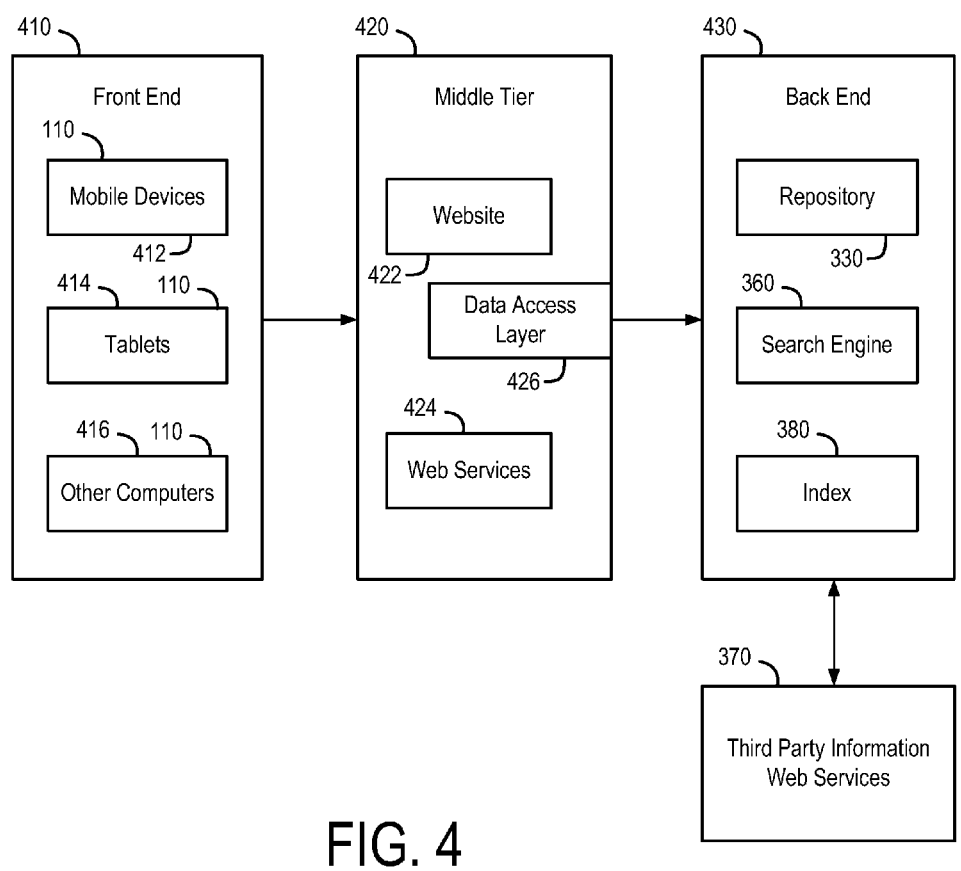

Referring now to FIG. 4, FIG. 4 shows another view of the architecture of the system 100. As shown in FIG. 4, the system 100 may comprise a front end 410, a middle tier 420, and a back end 430. The front end 410 may include various devices 110 that may be used by the user to access the system 100, such as a mobile device (e.g., smartphone) 412, tablet computer 414, and other computing devices 416. As will be appreciated, these various types of devices may provide various types of client programs to access relevant content at a particular location, such as mobile applications running on mobile phones, applications running on tablet computers, and web applications accessed on computers. Other types of devices and client programs may also be used. Users may also access relevant information through integration with other third-party applications and devices/appliances.

The middle tier 420 includes a website 422, web services 424, and data access layer 426. Operations such as adding, deleting, searching and finding relevant content may be performed via the website 422 and web services 424. The back-end 430 includes repository 330, search engine 360, and index 380, which were discussed above in connection with FIG. 3.

Figure 5:
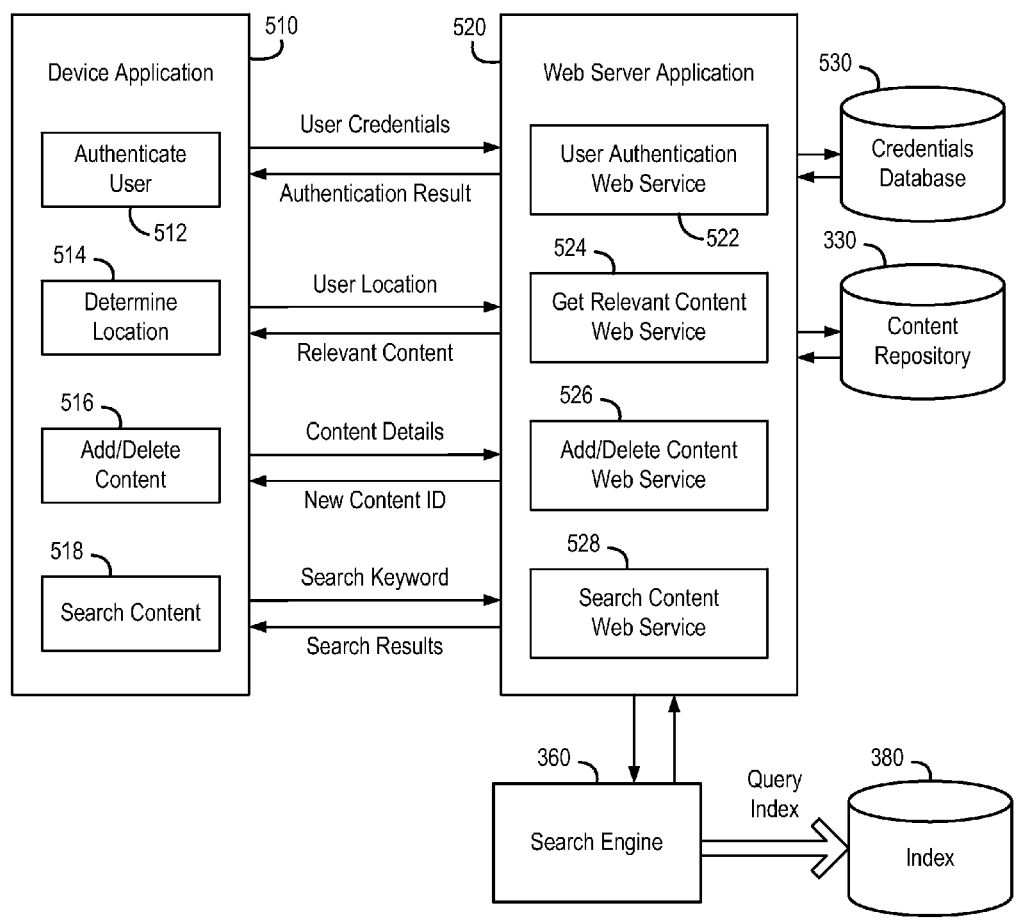
FIG. 5 shows details of communications that occur between components of a device application executing on a user computing device and a web server application executing at the system of FIG. 1.
Figure 6:
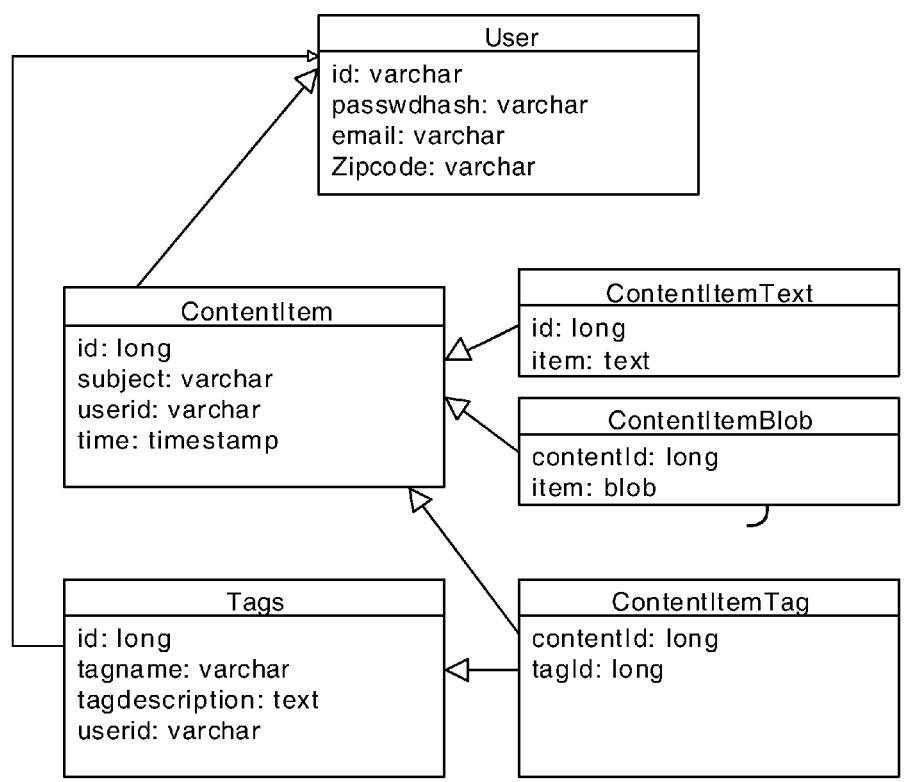
FIG. 6 shows an example unified modeling language (UML) diagram describing the system of FIG. 1.

Referring now to FIG. 5, FIG. 5 shows details of communications that occur back and forth between components of a device application 510 executing on the computing device 110 and a web server application 520 executing at system 100. An authenticate user component 512 communicates user credentials to user authentication web service 522, which accesses credentials data base 530 and provides an authentication result back to the computing device 110. A determine location component 514 communicates user location information to a get relevant content web service 524, which accesses search engine 360 and provides relevant content back to the computing device 110. An add/delete content component 516 communicates content details to add/delete content web service 526, which accesses the content repository 330 and (in the case of added content) provides new content identification information back to the computing device 110. A search content component 518 communicates search keyword information to a search content web service 528, which accesses search engine 360 and provides search results back to the computing device 110. Referring now to FIG. 6, FIG. 6 shows an example unified modeling language (UML) diagram describing the system 100 in one embodiment.

Figure 7:
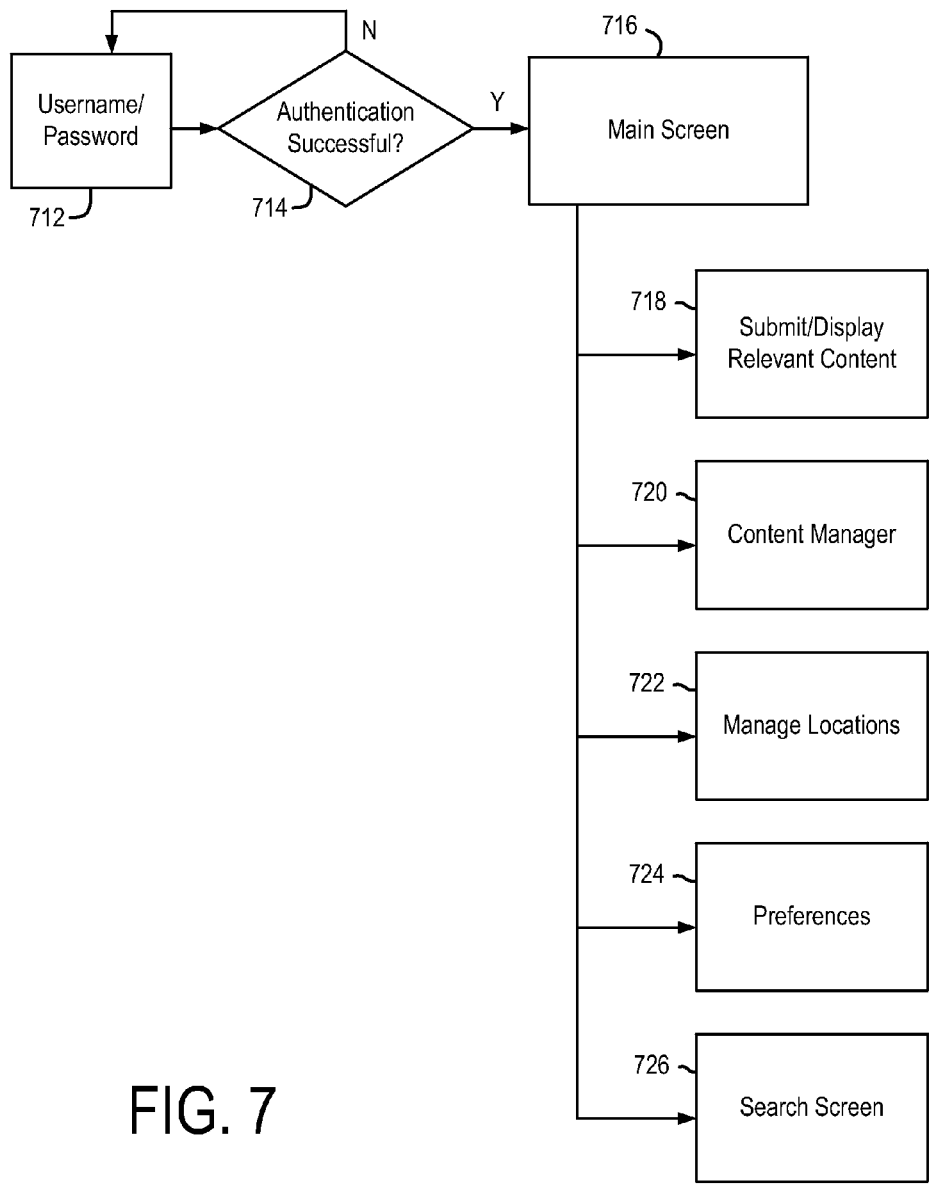
FIG. 7 shows an overall flow diagram for screens that may be presented to the user.
Figure 8:
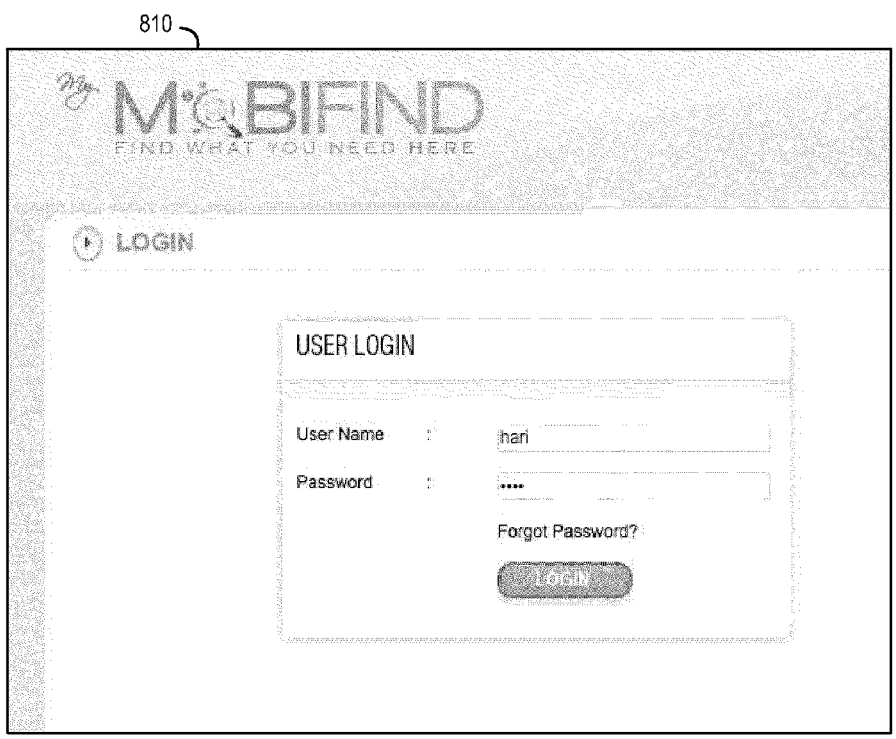
FIGS. 8-11 show screens that may be presented to a user in the context of a web/desktop application.

Referring now to FIGS. 7-19, various screens that may be provided to the user by the system 100 are shown. FIG. 7 shows an overall flow diagram for screens that may be presented to the user. FIGS. 8-11 show screens that may be presented to a user in the context of a desktop/web application. FIGS. 12-19 show screens that may be presented to a user in the context of a mobile application.

As shown in FIG. 7, the user may initially be presented with a login screen at step 712. Examples of login screens are shown by screen 810 in FIG. 8 and screen 1210 in FIG. 12. If login is successful at step 714, then the user proceeds to a main screen at step 716. From the main screen, the user may access a plurality of additional screens, including submit/display relevant content screen(s) (step 718), content manager screen(s) (step 720), manage locations screen(s) (step 722), preferences screen(s) (step 724), and search screen(s) (step 726).

FIGS. 9-10 and 13-14 show submit and display screens presented in the context of a desktop application and a mobile application, respectively. Hence, in FIG. 9, the user has an email with an e-ticket for a recent flight booking. The user anticipates needing the email at the airport, and tags the e-ticket receipt using the web application 312. The tag "airport" and the e-ticket contents are shown in two separate fields 912 and 914. Upon pressing save button 916, the content item and tag are saved to the repository 330. As will be appreciated, the user may also use any other input methods outlined elsewhere like e-mail plugins and browser plugins, and so on.

Figure 10:
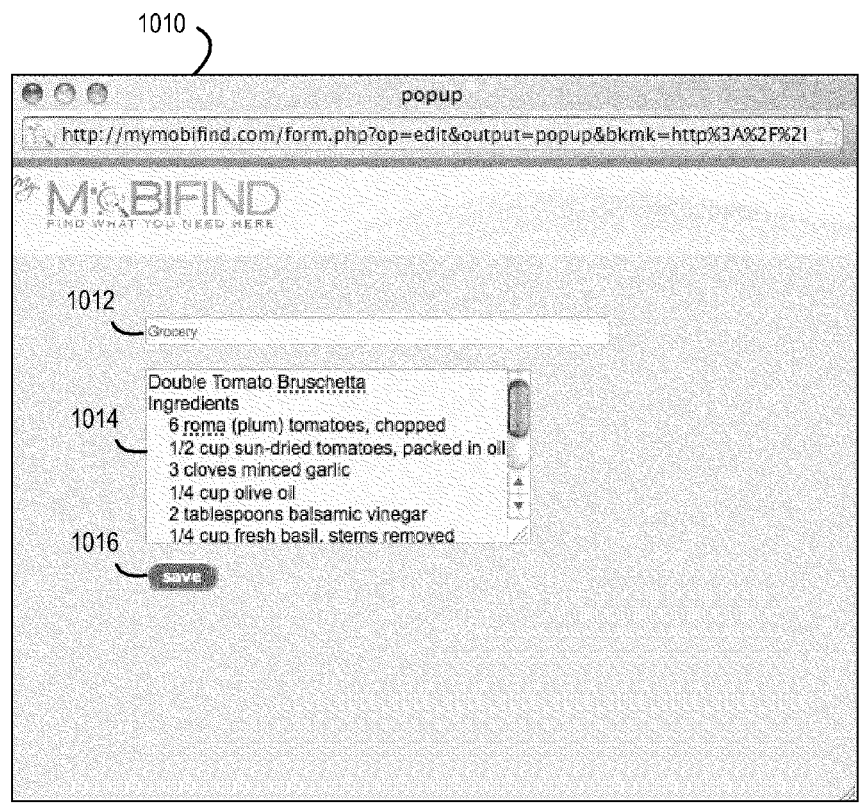

Similarly, in FIG. 10, the user is tagging a web clip. For example, the user may have found a recipe on the Internet and may want to buy the list of ingredients during the next visit to the grocery store. The user is tagging the recipe ingredient list using the web application 312. Again, the tag "grocery" and the ingredient contents are shown in two separate fields 1012 and 1014. Upon pressing the "save" button 1016, the content item and tag are saved to the repository 330. Again, as will be appreciated, the user may also use any other input methods outlined elsewhere such as e-mail plugins, browser plugins, and so on.

Figure 9:
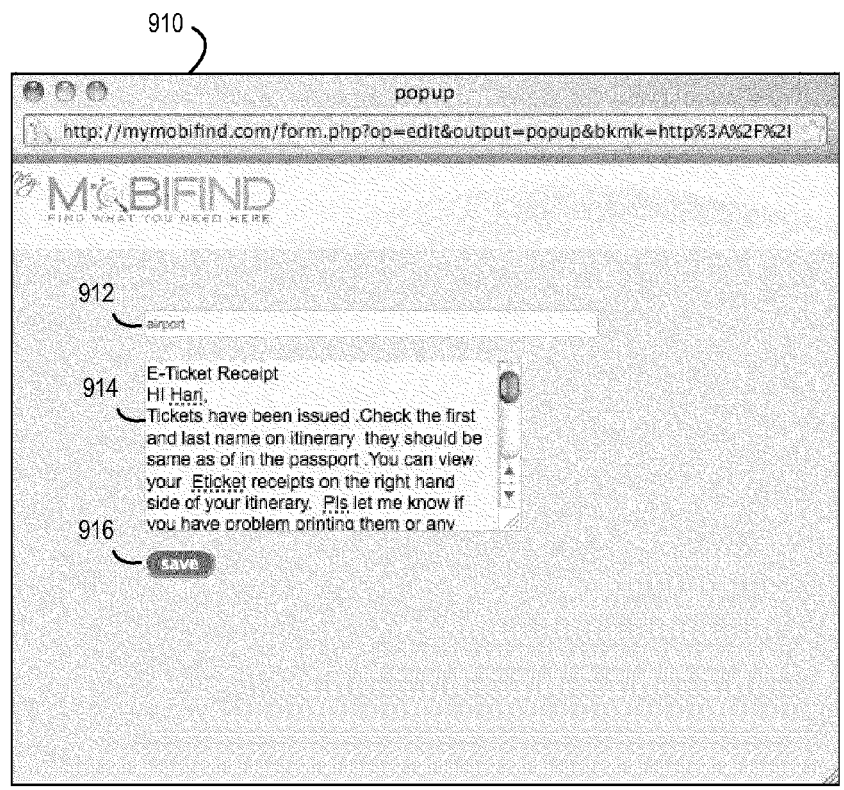
Figure 13:
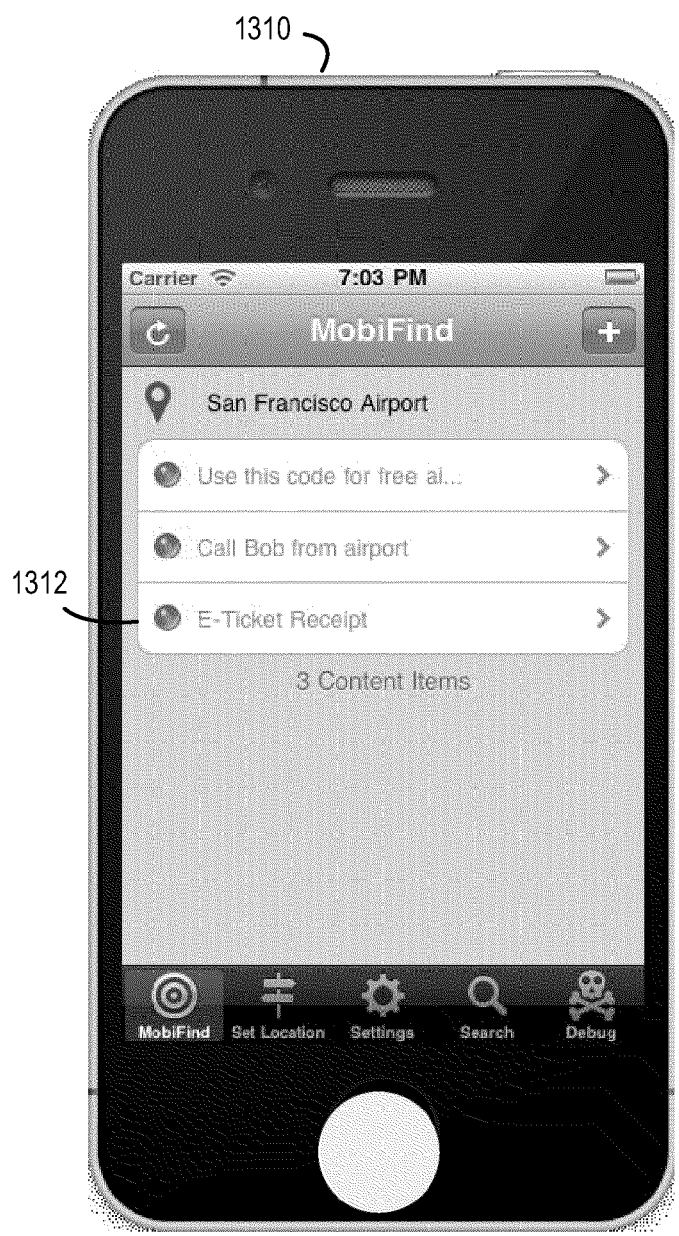

With reference to FIG. 13, FIG. 13 shows how the information saved in FIG. 9 may be presented to the user, e.g., on a mobile device 412. In FIG. 13, relevant content is displayed to the user at an airport (e.g., automatically after launching) in field 1312. It may be noted that the system 100 presents only three items at the airport-e-ticket receipt, wifi code, and a ToDo-note (i.e., because the items were tagged "airport" or had keywords that matched closely to "airport" in its contents). Specifically, it did not bring up any of the grocery items.

Figure 14:
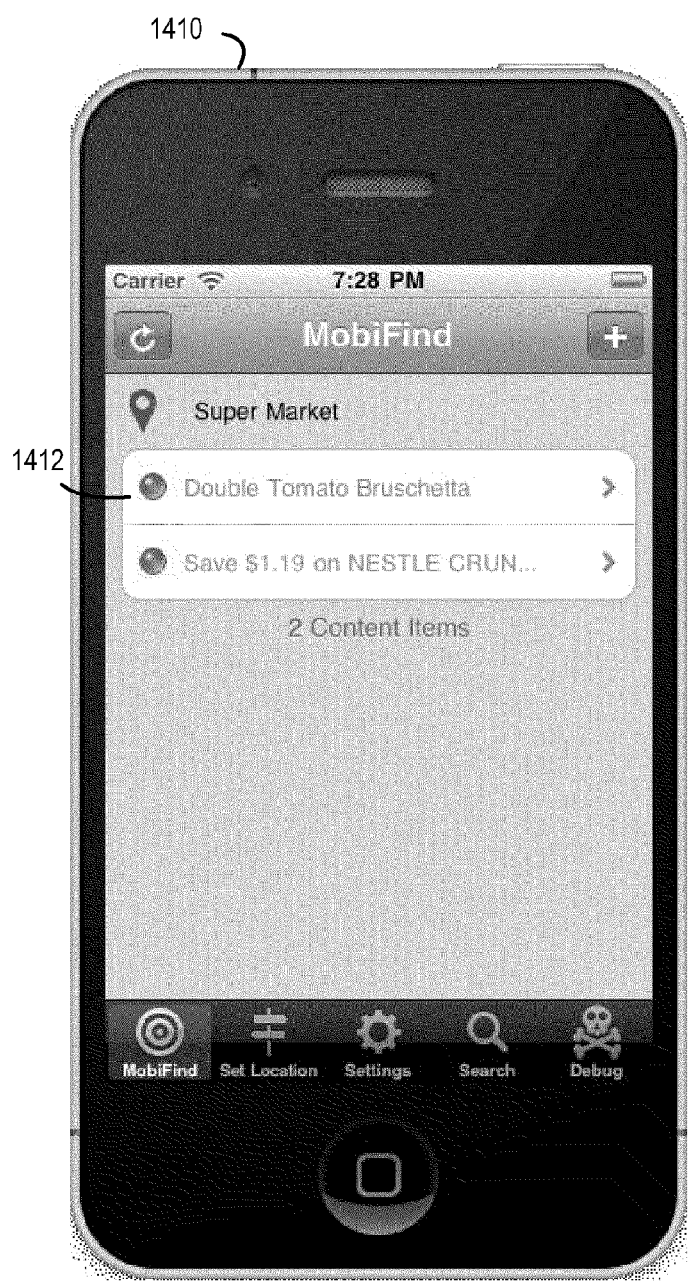

Next, with reference to FIG. 14, FIG. 14 shows how the information saved in FIG. 10 may be presented to the user, e.g., on mobile device 412. In FIG. 14, the relevant content is displayed to the user at a grocery store (e.g., automatically after launching) in field 1412. It may be noted that the system 100 presents only two items at the grocery store—the recipe ingredient list and a coupon for a candy bar (i.e., because all the items were tagged "grocery" or had keywords that matched closely to "grocery" in its contents). Specifically, it did not bring up any of the items tagged for airport.

Figure 11:
Figure 12:
FIGS. 12-19 show screens that may be presented to a user in the context of a mobile application.

Referring now to FIG. 11, FIG. 11 shows how a content manager may be used to manage the content saved in FIGS. 9-10. Hence, in FIG. 11, the content added in FIGS. 9 and 10 is shown in fields 1112 and 1114, respectively. If, for example, the user wishes to delete the e-ticket content saved in FIG. 9, then the user may select checkbox 1116 and click delete button 1118. Users may add, delete, search and edit content via the screen shown in FIG. 11.

Figure 15:
Figure 16:
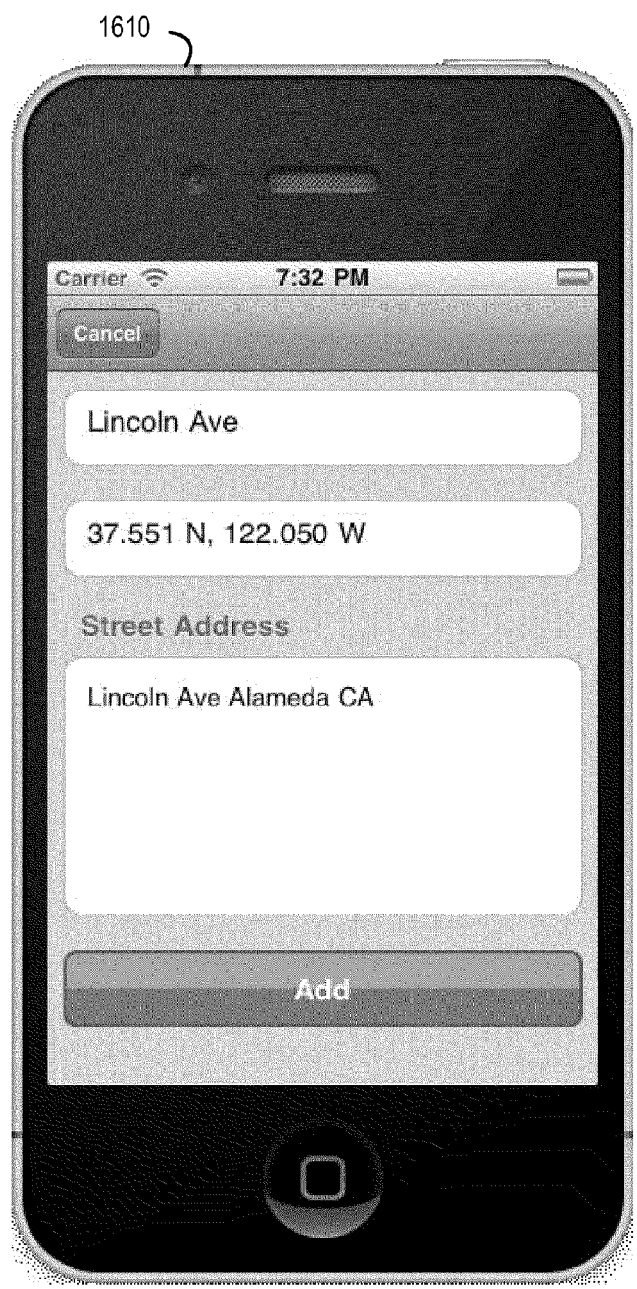
Figure 17:
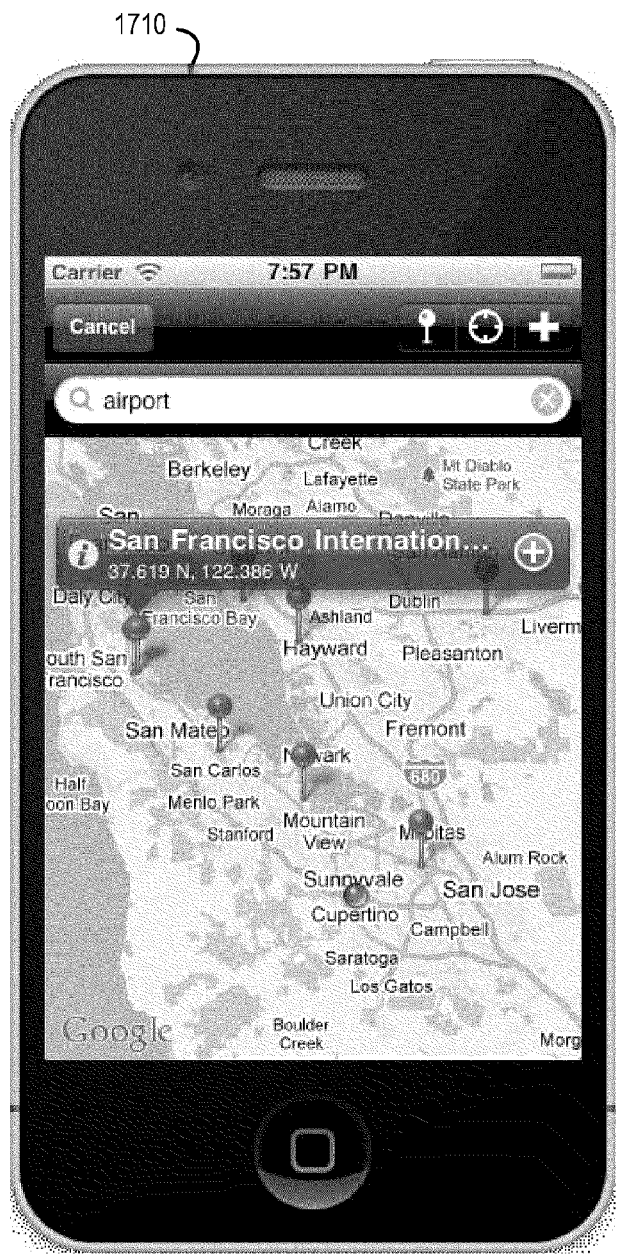

Referring now to FIGS. 15-17, FIG. 15 shows a manage locations screen 1510 that may be presented to the user. The user may simulate being at a particular location (e.g., other than the user's current location) using screen 1510. The system 100 operates as if user is currently at that location and computes and delivers relevant information for that location. For example, if the user is planning a trip to the Statue of Liberty, the user can select to simulate being at Battery Park to determine what content will be displayed to the user at Battery Park. The system 100 may also allow users to maintain a list of locations or select a location instantly by entering pertinent information. Such information may be entered by entering direct coordinates or street address (FIG. 16), by choosing from a map (FIG. 17), or in another manner. Other contexts (e.g., date and/or time) may also be simulated.

Figure 18:

Referring now to FIG. 18, FIG. 18 shows a user preferences screen 1810 permits a user to configure user preferences. In FIG. 18, the user preferences comprise how far to search and how far the user has to move from current location before the display will auto-refresh content again. As will be appreciated, the system 100 may also permit the user to configure other types of user preferences.

Figure 19:
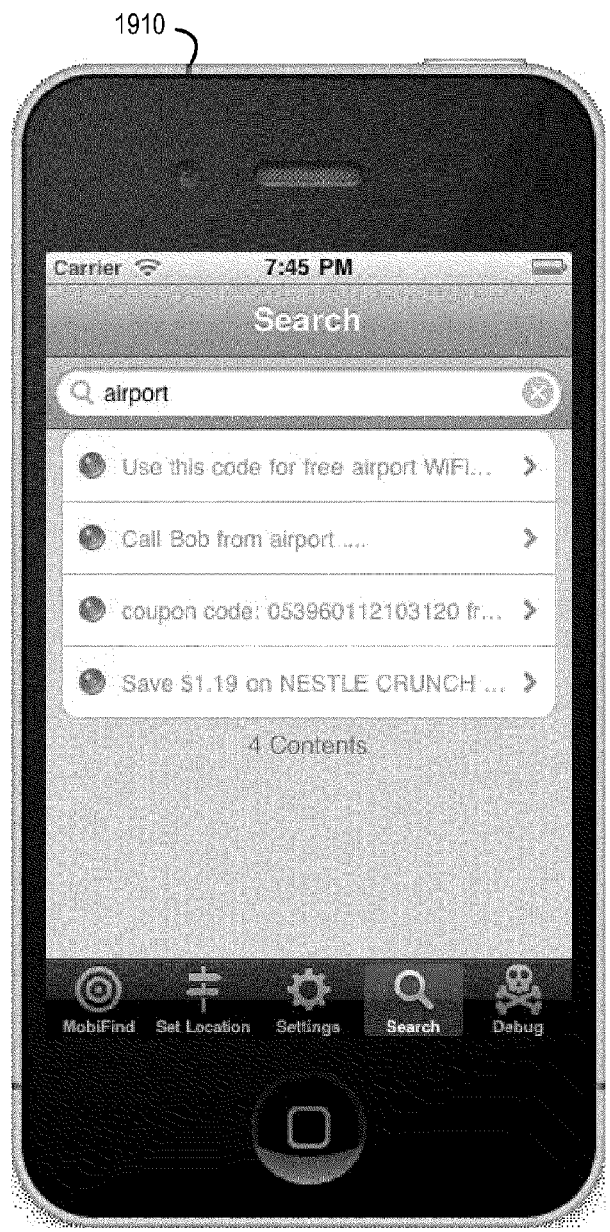

Referring now to FIG. 19, FIG. 19 shows an example search results screen 1910. In FIG. 19, the user has searched for content containing the keyword "airport" in the repository 330.

The system 100 may also be provided with features that enhance its usefulness for social networking and that make it more viral. For example, users may share their content with other users. Additionally, users may share their content with potential users, who may then be invited to become users before being permitted to view the shared item. For example, a real estate agent may use the system 100 while showing many houses to a list of potential buyers. When the agent walks into the first house with a customer to show the house, all information about the house (e.g., square feet, number of bedrooms, asking price, and so on) is displayed. This is because the real estate agent has pushed all MLS information about the houses the agent plans on showing to the user ahead of time. Then, on visiting a house, the system 100 delivers the MLS information about only that house. The real estate agent may then also share info this information with the potential house buyer. If the potential house buyer is already a registered user of the system 110, the potential buyer may view the information immediately on the buyer's mobile device at that location. Also, in the future, if the potential buyer revisits any of the houses, the shared MLS information may be automatically be shown by the system 100. If the potential buyer is not a registered user, the potential buyer may be invited to register by the system 100 before being permitted to view the shared item.

As has been described, the system 100 may be used by users to deliver information (emails, documents, etc) to themselves at particular locations. The service 100 may also be used by one registered user to deliver information to another registered user when the other registered user reaches a particular location. For example, if the first user wants to deliver a message (e.g., "Be sure to try this dish next time you are at the French Restaurant") to the second user, the first user may send that message to second.user@mymobifind.com. The first user may tag the message, e.g., by providing the tag in the subject line of the e-mail, etc., as described above. Then, when the second user is at the restaurant, the message from the first user is delivered. This is generally identical to the second user adding that content to the second user's repository except that, in this case, the content is added as a result of the system 100 receiving a "location-tagged" email from the first user. As will be appreciated, the message is in the second user's repository at the system 100 and the second user may access it anytime by searching the repository with the appropriate keywords. However, unless the second user specifically searches for that email, the second user will not see that email until the second user reaches the restaurant. Hence, while emails in general are delivered right away, in this case, email delivery is delayed until the second user reaches the location of interest. Email delivery is displaced in time and tied to a location. This avoids information clutter and saves organizing efforts.

The system 100 may also be configured to deliver advertising relevant to user's content based on the system's determination of relevant content user might need at this location. For example, if the user is at a grocery store and the system 100 is delivering a grocery list, the system 100 may also deliver advertisements related to items in the grocery list. These may be highly actionable advertisements such as coupons that user may use right away. Advertisers may buy advertisements related to tags, e.g., akin to keyword advertising in the context of internet search engines. For example, a cereal product company may buy advertisements to be displayed whenever items containing the tag "grocery" is delivered to users of the system 100. Such purchased tags are referred to herein as TagWords, essentially keywords that may be used as tags in the system 110. Other third party information (e.g., other than advertising) may also be displayed, such as business directory information for nearby businesses, customer review information for nearby businesses, and so on.

As has been described, the system 100 provides a location-based information display service to help users easily access information. In these examples, the context of the user is determined based on the user's location. In other example embodiments, the context of the user may be determined based on other or additional information. For example, the system 100 may determine that the user is supposed to be at a meeting with another individual (e.g., based on the user's Outlook calendar). In this example, the context of the user is that the user is supposed to be at a meeting. On this basis, the system 100 may present the user with contact information regarding the individual, in case the user is running late to the meeting. As another example, other information regarding the individual may also be provided, such as a photo (e.g., if the other individual is not very well known to the user), biographic information (e.g., if the other individual just had a birthday), family information (e.g., if the user wants to ask about the other individual's children), reminders (if the user wanted to talk to the other individual about a specific issue unrelated to the meeting), and so on. As another example, the context of the user may be that it is the user's birthday. On this basis, the system 100 may present the user with information that has been tagged "birthday" by the user in the past. Other examples of the system 100 providing context-based information display where the context is determined based on parameters other than location also exist.

The embodiments of the methods and system have been described with reference to drawings. The drawings illustrate certain details of specific embodiments that implement the systems and methods and programs of the present invention. However, describing the invention with drawings should not be construed as imposing on the invention any limitations that may be present in the drawings. The embodiments described above contemplate methods, systems and program products stored on any non-transitory machine-readable storage media for accomplishing its operations. The embodiments may be implemented using an existing computer processor, or by a special purpose computer processor incorporated for this or another purpose or by another system.

Embodiments can include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable storage media may comprise RAM, ROM, EPROM, EEPROM, CD-ROM or other optical disk storage, magnetic disk storage or other magnetic storage devices, or any other medium which may be used to store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, logics, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, mini-computers, mainframe computers, and so on. Embodiments of the invention may also be practiced in distributed and cloud computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It should be noted that although the discussions herein may refer to a specific order and composition of method steps, it is understood that the order of these steps may differ from what is described. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A computer-implemented contextual-based information display service comprising:
   a processor and machine-readable storage media having instructions stored therein that, when executed by the processor, implement
      a user repository, the user repository having stored therein content received from a user, the user content including a time-displaced e-mail message including a location of interest, the time-displaced e-mail message is only accessible by the user as a result of searching the user repository; and
      a search engine, the search engine being configured to receive context keywords characterizing a current context of the user, wherein the context keywords were generated by the processor, and the search engine being configured to perform a search based on the context keywords to identify content relevant to the user in the current context, wherein the search identifies the time-displaced e-mail message based on the location of interest.

2. The system of claim 1, wherein the content received from the user comprises a plurality of content items, and wherein the service further comprises a keyword index, the keyword index comprising a plurality of content keywords associated with the plurality of content items.

3. The system of claim 2, wherein the content keywords comprise user-assigned tags for the plurality of content items.

4. The system of claim 3, wherein the search engine performs the search by identifying matches between (i) the user-assigned tags and (ii) the context keywords.

5. The system of claim 3, wherein the search engine performs the search by identifying matches between (i) the plurality of content keywords in the keyword index and (ii) the context keywords.

6. The system of claim 1, further comprising a plurality of submission tools accessible by the user to submit the content.

7. The system according to claim 6, wherein the submission tools comprise a plurality of the following tools: a website application, a browser plugin, an e-mail plugin, a dedicated e-mail address, a desktop agent, and a mobile application.

8. The system according to claim 1, wherein the contextual-based information display service provides a tool permitting the user to simulate a context, the simulation of the context providing an indication to the user of the content to be provided to the user when the user is in the simulated context.

9. The system of claim 8, wherein the context is a location, and wherein the simulation provides an indication to the user of the content to be provided to the user when the user is at the simulated location.

10. The system of claim 8, wherein the context is a date and/or time, and wherein the simulation provides an indication to the user of the content to be provided to the user at the simulated date and/or time.

* * * * *